J. C. WAHL.
CHASING MACHINE.
APPLICATION FILED NOV. 22, 1920.

1,415,211.

Patented May 9, 1922.
9 SHEETS—SHEET 1.

J. C. WAHL.
CHASING MACHINE.
APPLICATION FILED NOV. 22, 1920.

1,415,211.

Patented May 9, 1922.
9 SHEETS—SHEET 2.

J. C. WAHL.
CHASING MACHINE.
APPLICATION FILED NOV. 22, 1920.

1,415,211.

Patented May 9, 1922.
9 SHEETS—SHEET 7.

J. C. WAHL.
CHASING MACHINE.
APPLICATION FILED NOV. 22, 1920.

1,415,211.

Patented May 9, 1922.
9 SHEETS—SHEET 8.

J. C. WAHL.
CHASING MACHINE.
APPLICATION FILED NOV. 22, 1920.

1,415,211.

Patented May 9, 1922.
9 SHEETS—SHEET 9.

UNITED STATES PATENT OFFICE.

JOHN C. WAHL, OF CHICAGO, ILLINOIS, ASSIGNOR TO THE WAHL COMPANY, OF WILMINGTON, DELAWARE, A CORPORATION OF DELAWARE.

CHASING MACHINE.

1,415,211.  Specification of Letters Patent.  Patented May 9, 1922.

Application filed November 22, 1920. Serial No. 425,903.

*To all whom it may concern:*

Be it known that I, JOHN C. WAHL, a citizen of the United States, and resident of Chicago, in the county of Cook and State of Illinois, have invented a certain new and useful Improvement in Chasing Machines, of which the following is a full, clear, concise, and exact description, reference being had to the accompanying drawings, forming a part of this specification.

My invention relates to improvements in chasing machines and is particularly concerned with improvements in chasing machines designed to engrave sinuous or zig-zag lines upon cylindrical surfaces but is not, in any sense, limited solely to this use.

The objects of my invention are,

First; to provide a machine by means of which surfaces and especially cylindrical surfaces can be engraved with a plurality of sinuous lines lying side by side.

Second; to provide a machine of the character described comprising means for engraving a plurality of sinuous lines, all parts of which are parallel with each other or engraving a plurality of sinuous lines, the crests of succeeding lines being offset or displaced relatively to each other.

Third; to provide a chasing machine comprising a work holding spindle, a chasing tool, means for reciprocating said work holding spindle and chasing tool relatively to each other, means for successively rotating the work holding spindle through predetermined arcs to bring successive portions of the work underneath the chasing tool and means for bringing the chasing tool into and out of engagement with the work comprising a carrier for carrying a plurality of templates, the said template carrier being easily removable from the machine and provided with detachable means for controlling the relative movement between the work carrying spindle and the chasing tool so as to vary the pattern being engraved upon the work, and Fourth; to provide an engraving machine comprising a work holding spindle, a chasing tool, means for reciprocating the spindle and tool relatively to each other, and means for transmitting power to the movable parts of the machine comprising a clutch or other equivalent which is automatically rendered inoperative to transmit power when the work holding spindle has been rotated through a predetermined arc.

Other objects will appear as this description progresses, reference being had to the accompanying drawings in which—

Referring to the drawings, reference character 20 indicates the bedplate of my improved machine which may be supported by suitable legs or pedestals 21. A slide 22 is reciprocably mounted upon the bedplate 20, the slide being provided with a dove-tail longitudinally extending groove 23 for receiving a similarly shaped guide 24 forming a part of the bedplate. A block 25 carrying a plurality of dead centers 26 is secured to the forward end of the slide 22 and provided with a plurality of set screws 27 for holding the dead centers in their adjusted positions. A bearing block 28 is secured intermediate the ends of the slide 22 and provides a plurality of bearings for the work holding spindles 29, the forward ends of which are provided with centering cones 30 for receiving the correspondingly-shaped ends of the mandrels 31 and also provided with slots 32 for receiving the pins 33 projecting from opposite sides of the adjacent ends of the mandrels, said pins and slots providing means for establishing a positive drive between the spindles 29 and the mandrels 31.

A side plate 35 is suitably secured to each side of the bed plate. These plates act as supports for the shaft 36 which extends transversely of the machine and upon which are pivotally mounted the chasing tool levers 37. The forward ends of these levers are provided with heads 38 having vertical cylindrical bores extending therethrough for slidably receiving the chasing tool 39, the lower end of which is preferably provided with a diamond point 40. The upper end of the chasing tool has a pin 41 extending therethrough; the ends of which slide in and project beyond slots 42, formed in the sides of the cylindrical head 38. A spring 43, having a bifurcated end fitting around the head 38 and extending beneath the projecting ends of the pin 41 tends to lift the chasing tool upwardly. For the purpose of accurately adjusting the chasing tool toward the work, I provide the bolt 39' and the upper end of the wall of the bore in the head 38 with co-acting screw-threads. The bolt 39' can be rotated by means of the knurled head of the cap 44, the flange 45 of which is provided with index divisions similar to those on a micrometer for indicating the proper adjustment of the chasing tool.

Suitably secured to shaft 50 which is rotatably mounted between the side plates 35 is a template lever comprising a rearwardly extending arm 51 and three forwardly extending arms 52. The ends of the forwardly extending arms are provided with longitudinal slots 53 for receiving the shanks of bolts 54, the upper ends of which pass through suitable openings in the bar 55 and are provided with nuts 56 for securing themselves to the ends of the arms 52. The heads 57 of the bolts engage the anvils 58 at the rear end of the levers 37. Tension springs 58, secured to the rear ends of the levers 37 and to adjusting bolts 59 supported by the cross bar 60 provide means in connection with the nuts 61 whereby the chasing tools are yieldingly urged toward the work carried by the mandrels 31. The rear end of the arm 51 carries a head 51ª similar in construction to the head 38 in which is slidably mounted a cylindrical rod 62, the lower end of which is provided with a follower point 63 which is adapted to contact with the removable templates 64 carried by the template drum 65. The cylindrical rod 62 is provided with means for supporting it and adjusting it to and from the removable template 64 similar to that used for supporting and adjusting the chasing tool 39 and further description thereof will, therefore, be omitted.

The arm 51 of the template lever is provided on its under side with abutment 66 which co-acts with a transversely extending bar 67 to limit the movement of the arm 61 and consequently the follower point 63 toward the template drum.

Figure 3:
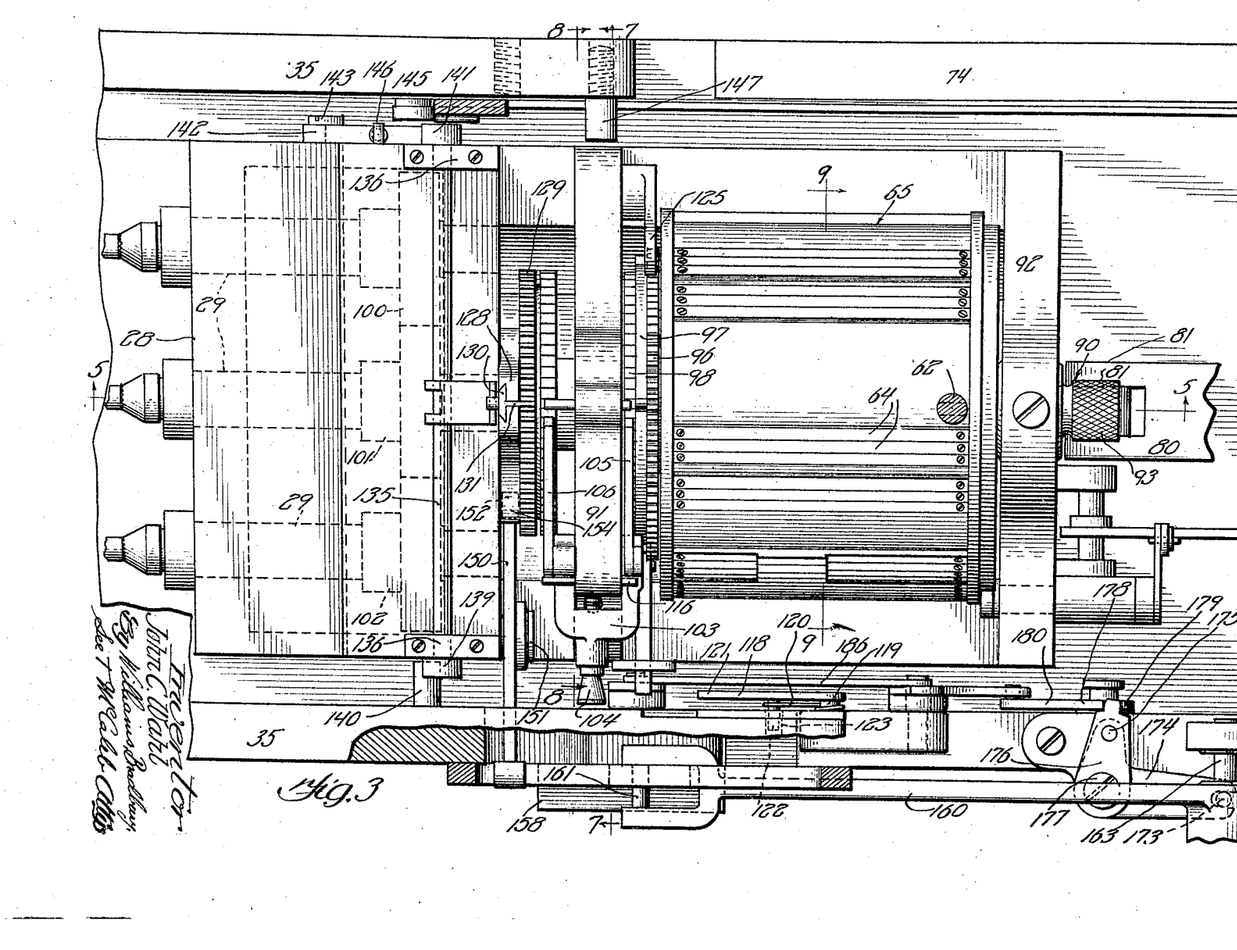
Figure 3 is a plan view on an enlarged scale of a portion of my improved machine, certain portions of the mechanism being broken away or removed, along line 3—3 of Figure 1.

For reciprocating the slide 20 relative to the bed-plate, I provide the two lever arms 70 and 71 which are secured to and extend at an angle to each other from the shaft 73 which is, in turn, rotatably mounted in the side plates 74 and 75 secured to the bedplate. Anti-friction rollers 76 and 77 are secured to the levers 70 and 71 respectively, adjacent the ends thereof and contact with the peripheries of the complemental cams 78 and 79 respectively. The outer end of the lever 71 is pivotally connected with the rear end of the link 80, the forward end of this link being pivotally connected as shown at 81, (see Figure 3) with the rear end of the slide 20.

Figure 2:
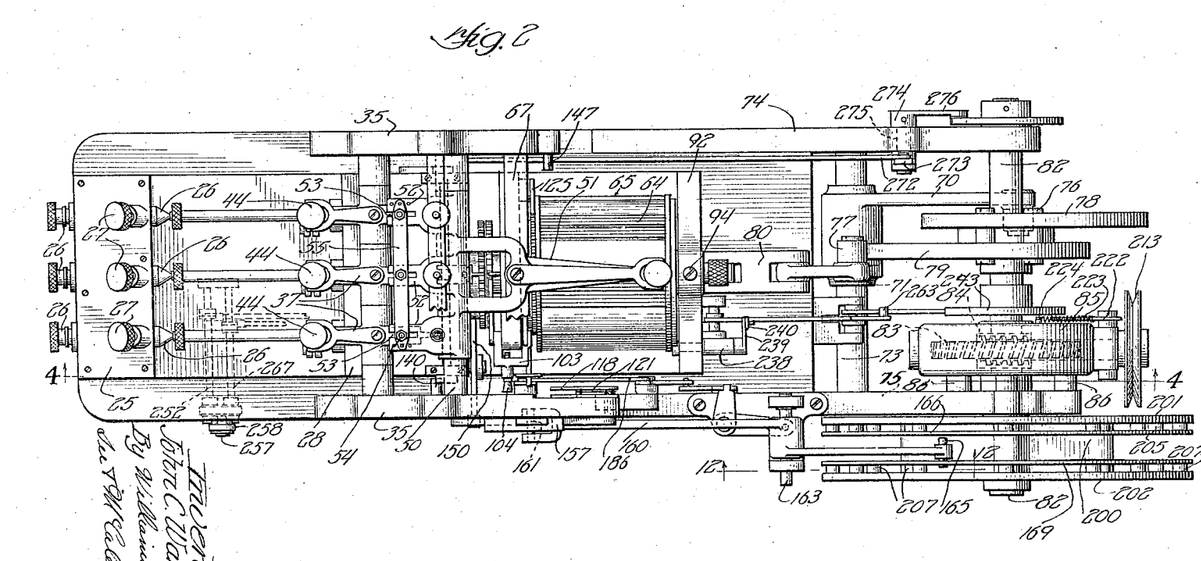
Figure 2 is a plan view.

The two cams 78 and 79 are secured to the shaft 82 which is rotatably mounted in the rear ends of the side plates 74 and 75. A worm wheel 83 is secured to the shaft 82 and meshes with a worm 84 which is rotatably mounted in suitable bearings formed in the lower side of the housing 85 that encloses the worm and worm gear. Housing 85 is supported from the side plate 75 by means of studs 86 (see Figure 2.)

The mechanism thus far described is similar to that described in my co-pending application, Serial #286,964 filed April 2nd, 1919, now Patent No. 1,395,316, granted Nov. 1, 1921, and is not claimed herein except as the parts referred to enter in the combination with the parts about to be described.

Whereas in my prior mechanism described in the application above referred to, the template drum is rigidly secured to a shaft forming an extension of the central work carrying spindle, in my present construction the template drum 65 is rotatably mounted upon the removable shaft 90, the ends of which are supported by the pedestals 91 and 92 extending upwardly from the slide 20. The rear end of the shaft 90 is knurled, as shown at 93, to facilitate its withdrawal from the pedestals. The set screw 94 holds the shaft 90 in position.

Secured to the forward end of the drum 65 by means of screws 95 are a detent wheel 96, a cam 97 and a ratchet wheel 98. Rigidly secured to the rear end of the central spindle 29 is a ratchet wheel 99 of the same size and having the same number of teeth as the ratchet wheel 98.

For advancing the spindles 29, the outer ones of which are connected in driving relation with the central spindle by means of the spur gears 100, 101 and 102 substantially as shown in my co-pending application above referred to, through pre-determined arcs and at the same time rotating the template drum 65 through a corresponding arc, I provide the pawl lever 103, the inner end of which is bifurcated and pivoted to the pedestal 91 and the outer end of which is provided with an anti-friction roll 104. Pawls 105 and 106 are pivotally secured to the bifurcated ends of the pawl lever 103 and engage with the ratchets 98 and 99 respectively. The pawl lever 103 is yieldingly held in its lowermost position by means of a tension spring 107, the upper end of which is secured to the pin 108 on the pawl lever and the lower end of which is fastened to a pin 109 carried by the pedestal 91. The pawl 105 is yieldingly urged toward the ratchet 98 by means of a tension spring 110, one end of which is secured to the pawl and the other end of which is secured to a pin 111 projecting from the adjacent bifurcation of the pawl lever. In a similar manner, the pawl 106 is yieldingly urged toward the ratchet 99 by means of the spring 112 (see Figure 11) the lower end of which is secured to the pin 113 projecting from the adjacent pawl lever bifurcation. The pawls 105 and 106 are provided with projections 114 and 115, respectively (see Figures 7 and 8) which are engaged by the ends of the pin 116 extending through the upper end of the pedestal 91 when the pawl lever 103 is pushed downwardly, thereby lifting the ends of the pawls 105 and 106 from their co-acting ratchet wheels.

When the slide 22 is reciprocated carrying with it the pawl lever 103, the anti-friction roller 104 carried by the outwardly projecting end of the pawl lever is engaged by the cam plate 118. This plate is pivoted upon a pin 119 secured to the side plate 35 (see Figures 7, 8 and 11). The free end of the cam is urged downwardly by means of a spring 120 coiled around the pin 119, one end 121 of which bears downwardly upon the pin 122 secured to the cam plate. From the above description it will be clear that upon the return stroke of the slide 22, the anti-friction roller 104 will ride upon the upper edge of the cam plate 118, thus bringing the pawls 105 and 106 into co-acting relation with the corresponding ratchet wheels and thereby rotating the spindles 29 and the template drum 65 through equal arcs. The outer end of the pin 122 swings in a slot 123 (see Figure 3), the lower end of which determines the lowermost position of the cam plate 118. Upon the forward stroke of the slide 22, the anti-friction wheel 104 rides beneath the cam plate 118, causing the latter to rotate upwardly sufficiently to permit the anti-friction roller to pass therebeneath.

For holding the template drum in each of the positions to which it is advanced by the pawl 105, I provide a dog 125 which co-acts with the teeth formed in the periphery of the detent wheel 96. These teeth and the co-acting face of the dog 125 are so formed that the dog 125 will lift over the teeth as the template drum is advanced but will hold the template drum in any of its adjusted positions. If desired, the tension spring 126 can be provided for holding the dog 125 in contact with the teeth of the detent wheel 96.

Figure 5:
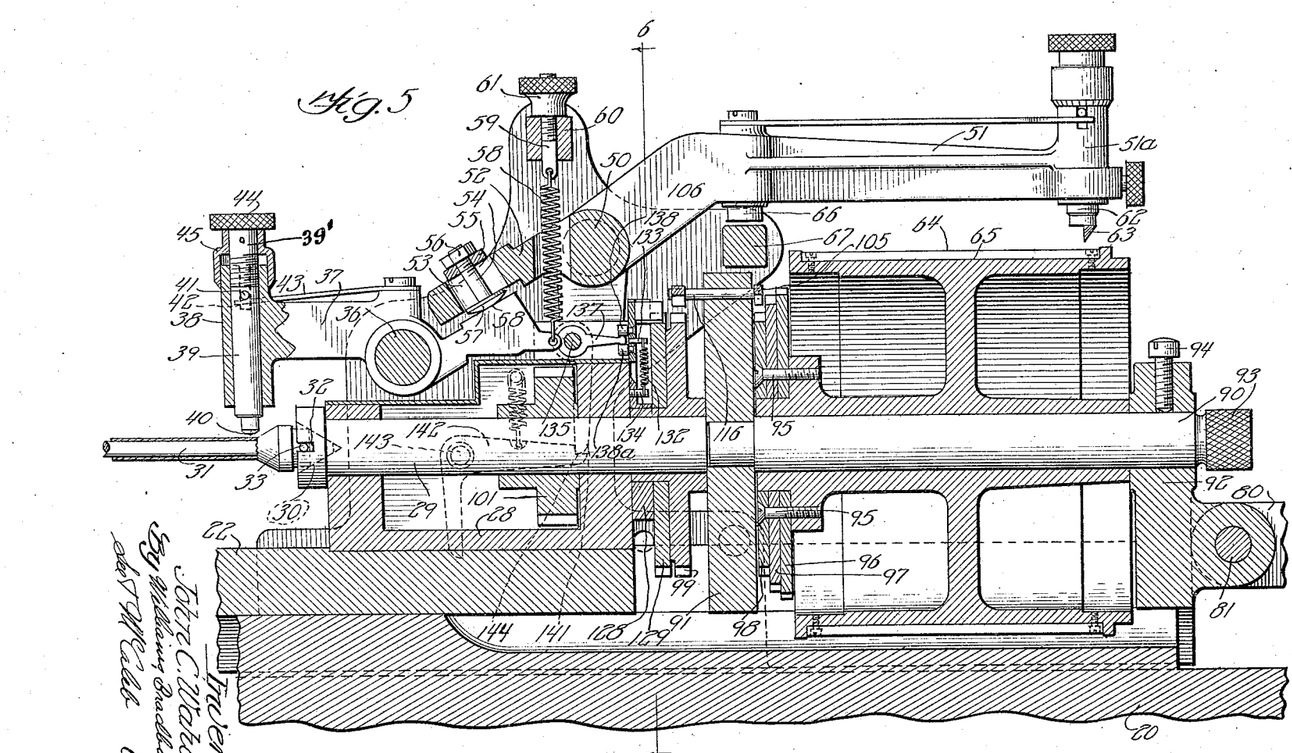
Figure 5 is a central vertical longitudinal section taken substantially on line 5—5 of Figure 3.

I shall now describe the means which I provide for oscillating the spindles 29 to cause the chasing tools to engrave sinuous lines upon the work. This means comprises a clutch member 128 which is rotatably mounted upon the central one of the spindles 29, and a second clutch member in the form of a wheel having teeth formed on the periphery thereof. A block 130 is slidably mounted in the clutch member 128 and provided with a dog 131 adapted to enter the spaces between the teeth of the toothed wheel 129. By this means the clutch member 128 can be connected with or disconnected from the toothed wheel 129, so as to either establish or destroy a driving connection between these two elements. The block 130 and consequently the dog 131 are urged inwardly by means of a tension spring 132 (see Figure 5), one end of which is secured to a pin 133 projecting from the block 130, and the other end of which is secured to a pin 134 projecting from a portion of the clutch member 128. For moving the block 130 outwardly to lift the dog 131 out of engagement with the teeth of the wheel 129, I provide the block shaft 135, the ends of which are journaled in suitable bearings 136 (see Figure 6) carried by the slide. An arm 137 secured to the shaft 135 projects rearwardly, its free end being confined between the pins 138 and 138ª which are in turn secured to the block 130. It will be noted from an inspection of Figures 6 and 11 that the free end of the arm 137 is rounded and at the same time transversely curved so that when it is in its neutral position the clutch member 128 can oscillate without causing any displacement of the block 130.

Figures 11, 12, 13, 14:
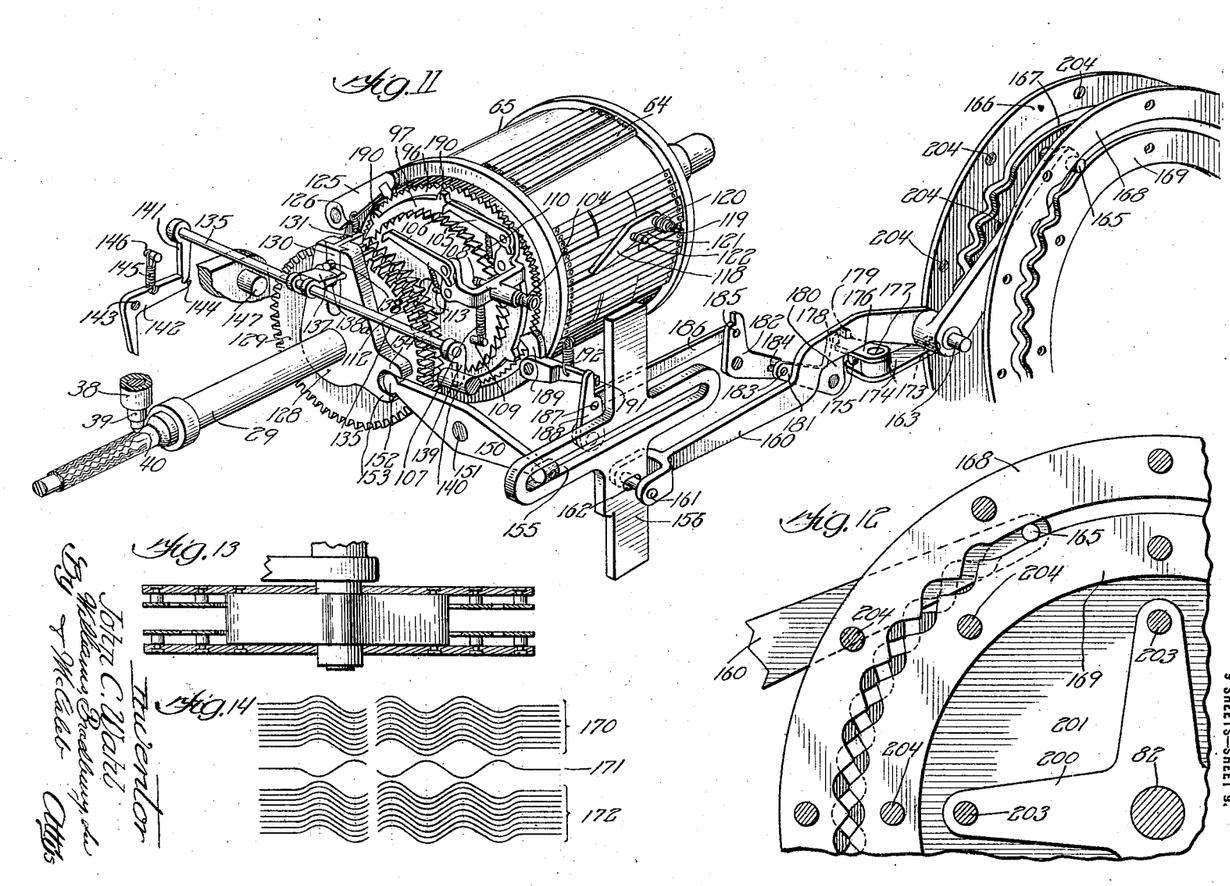
Figure 11 is a perspective view showing details of construction of the means which I employ for oscillating the work relatively to the chasing tool to produce zig-zag or sinuous lines.
Figure 12 is a vertical section taken on line 12—12 of Figure 2.
Figure 13 is a horizontal section taken on line 13—13 of Figure 1.
Figure 14 is a diagrammatic view illustrating the type of engraved lines produced by my machine.

One end of the shaft 135 is provided with a downwardly extending arm 139 which, upon the forward stroke of the slide, engages a pin 140 extending inwardly from the side plate 35, thereby causing the shaft 135 to rotate in such a manner as to move the block 130 and consequently the dog 131 outwardly through the action of the arm 137. This position is shown in Figure 11 in which the dog 131 is shown as being lifted to a position where it no longer engages the teeth of the wheel 129. Consequently, the dog 131 is locked in this position by means of the arm 141 secured to the opposite end of the shaft 135 and the bell-crank shaped latch lever 142 which is pivoted at 143 to the side of the slide 22. The rear end of this latch lever is provided with a notch 144 for receiving the end of the arm 141, the latch being held in this position by means of a tension spring 145, the upper end of which is secured to a pin 146 carried by the slide.

Upon the return stroke of the slide the lower end of the arm 141 is engaged by the pin 147 which extends inwardly from the opposite side plate 35, thereby disengaging the latch from the arm 141 and permitting the shaft 135 to be rotated in a clockwise direction (Figure 11) under the influence of the spring 132. This results in the block 135 moving into locking position between adjacent teeth of the wheel 129, thereby locking the clutch member and the toothed wheel 129 to each other. This action takes place subsequent to the previously described action whereby the spindles 29 and the template drum are rotated or advanced through a predetermined arc.

Figure 1:
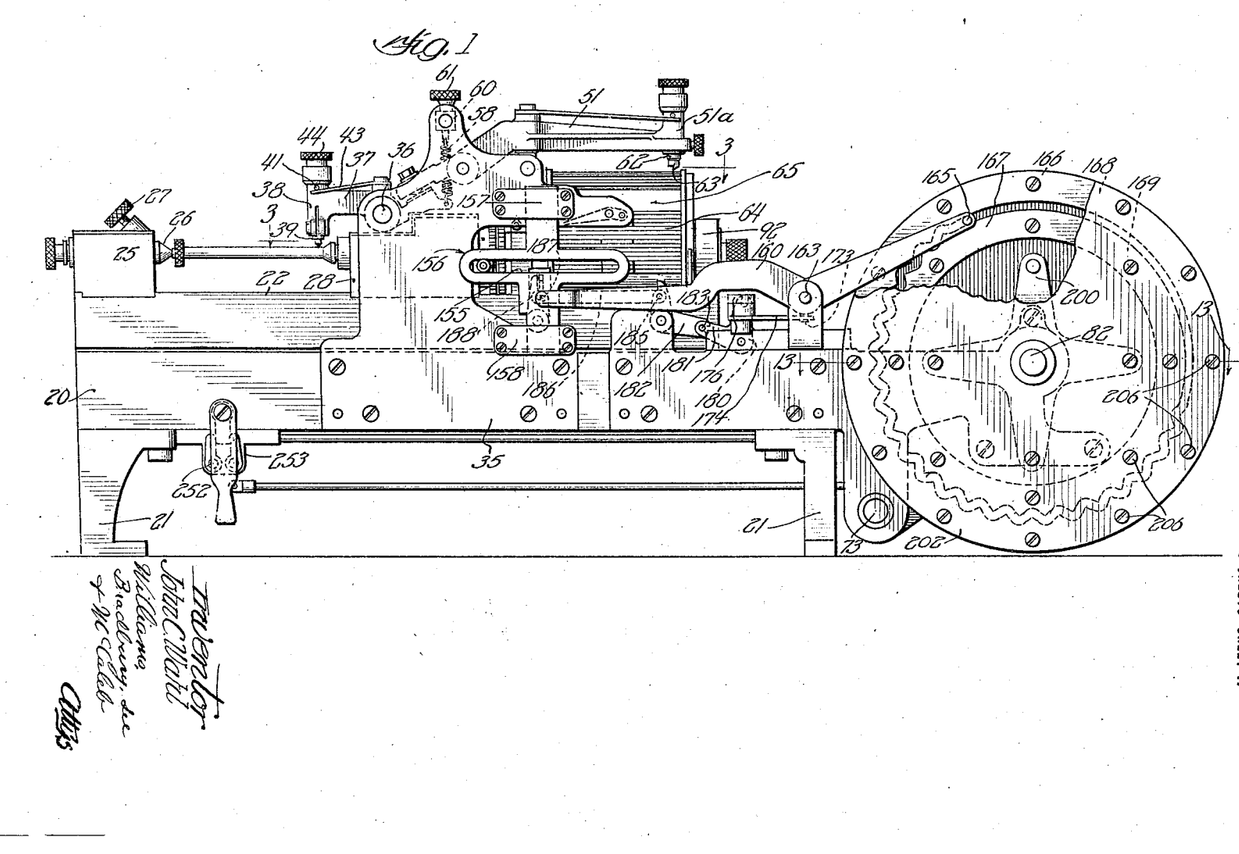
Figure 1 is a side elevation of my improved chasing machine, portions thereof being broken away for the purpose of better illustration.
Figure 6:
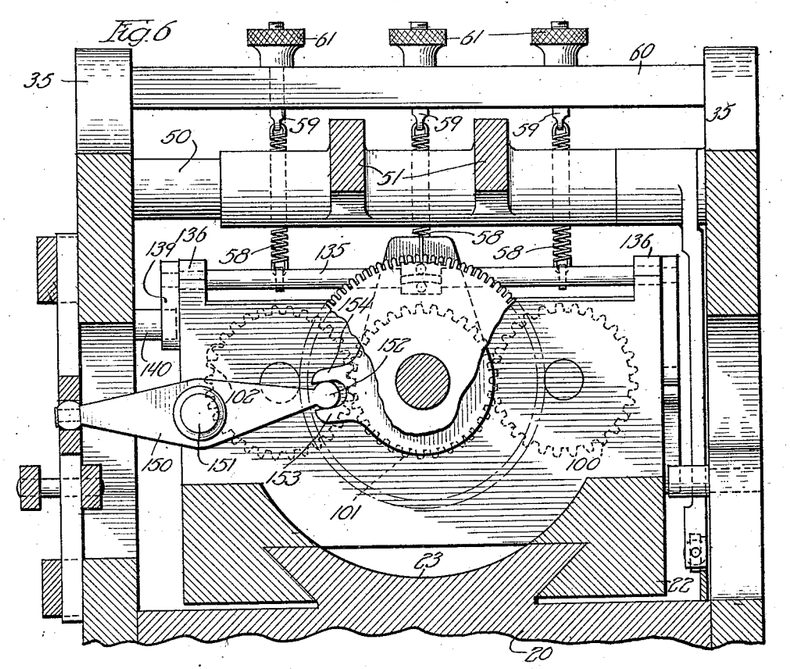
Figure 6 is a vertical transverse section taken substantially on line 6—6 of Figure 5.
Figure 7:
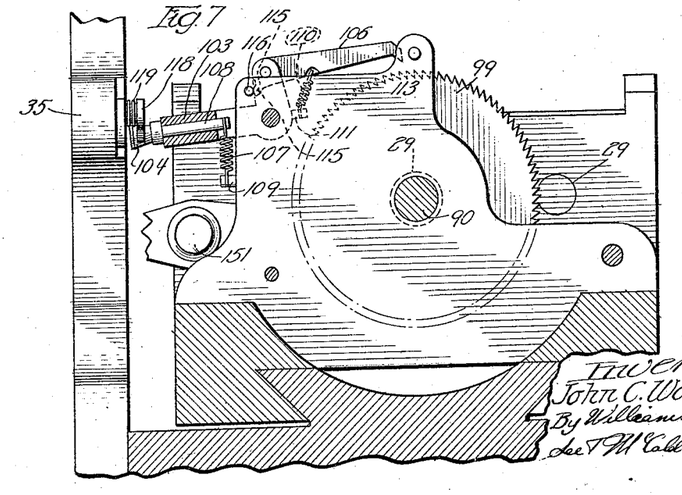
Figures 7, 8 and 9 are vertical transverse sections taken on lines 7—7, 8—8 and 9—9 respectively of Figure 3.
Figure 8:
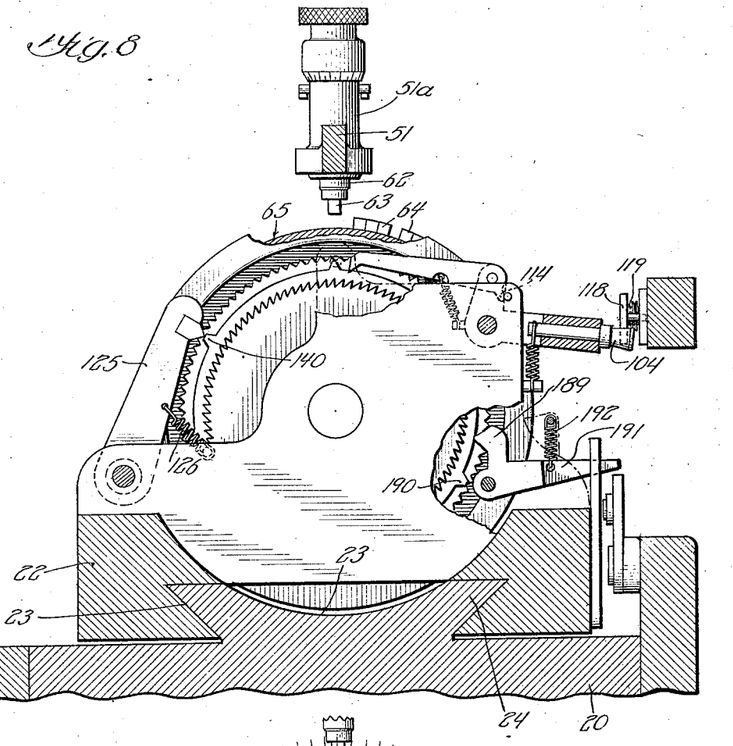

A lever 150 is pivoted at 151 to a portion of the slide (see Figures 6, 7 and 11). Its inner end 152 is confined between the bifurcations 153 and 154 of the clutch member 128 and its outer end rests between the two sides of the slot 155 formed intermediate the ends of the slide 156 and extending parallel with the line of motion of the slide 22, the slot 155 being slightly longer than the stroke of the slide 22. The upper and lower ends of the slide 156 are confined between the adjacent side plate 35 and the bearing plates 157 and 158, respectively (see Figure 1). In this manner the slide 156 is permitted to reciprocate in a vertical direction. For reciprocating the slide 156, I provide the lever 160, the forward end of which is bifurcated and carries a pin 161 operating in the short slot 162 of the slide 156. The lever 160 is pivotally mounted upon the shaft 163 (see Figures 1, 2 and 11) to oscillate in a vertical plane. The shaft 163 is sufficiently long to permit the lever 160 to be shifted laterally in either direction for a purpose which will be referred to later on. The rear end of the lever 160 is provided with a transversely extending pin 165, one end of which is adapted to be received between the adjacent edges of the concentric rings 166 and 167 (see Figures 11 and 12) and the other end of which is adapted to be received between the corresponding edges of the concentric rings 168 and 169. As shown in Figures 1, 11 and 12, the adjacent edges of each pair of rings are so conformed as to provide a sinuously-shaped slot to receive and guide the adjacent end of the pin 165. The sinuous slots formed by the two sets of rings 166—167 and 168—169 are so displaced relatively to each other that the crests of one slot are opposite the valleys of the other slot. The pin 165 is of such length that when one end is engaged by the sides of one slot, the other end will be disengaged from the sides of the other slot.

From the above description it will be clear that if the pin 165 is in engagement with the sides of one of the slots above referred to, and if the rings forming this side are being rotated at the same time that the slide 22 is passing through its cutting stroke, an up and down motion will be communicated to the slide 156 through the lever 160 by reason of the engagement of the pin 165 with the sinuous portion of the slot and that the up and down movement of the slide will be communicated through the lever 150 to the clutch member 128. Since at this time this clutch member is locked to the spindle 29, as described above, the spindle 29 and consequently, the work supported thereby, will be operated through a series of small arcs, the amplitude of which will depend upon the relative positions of the elements forming the operating mechanism. In this manner a plurality of lines corresponding to the lines 170 of Figure 14 can be formed. If it is then desired to form a line similar to the line 171 of the same figure in which the crests are opposed to the crests of the line 170 instead of being parallel therewith, the lever 160 is shifted to bring the opposite end of the pin 165 into co-acting relation with the other slot. Since the crests of the two slots are displaced 180° relatively to each other, a line corresponding to line 171 will be formed. It will, of course, be clear that a plurality of parallel lines 171 can be formed, if desired. If the lever 160 is then shifted to bring the pin 165 into co-acting relation with the sides of the first slot, a series of lines 172 can be formed which are parallel to the lines 170.

I shall now describe the means by which the lever 160 is shifted to displace the crests of the lines relatively to each other as described above.

A pin 173 (see Figure 11) projects downwardly from the bearing portion of the lever 160 and is received between the rearwardly extending bifurcations of the bell crank lever 174. The other arm of the bell crank lever 174 is connected by means of a pin 175 with a lever 176, which is pivoted upon the same pin 177 as the lever 174. The inner end of the lever 176 is reduced and received between the bifurcations 178 and 179 of the bell crank lever 180. The arm 181 of the bell crank lever 180 is connected with the rearwardly extending arm of the bell crank lever 182 by means of the pin 183 which operates in a slot 184. The other arm of the bell crank lever 182 is connected by means of the pivot pin 185 with a link 186. The forward end of the link 186 is pivotally connected by the pin 187 with the lever 188. It will be understood without further description that the various levers above referred to are pivotally mounted upon suitable portions of the adjacent side plate 35.

A pawl 189, which is pivotally mounted upon the slide in position to engage with the teeth or lobes 190 of the cam 97, has an outwardly projecting tail 191 which is normally held in position by means of a compression spring 192 to engage the upper end of the lever 188. The upwardly extending arm of the bell crank lever 182 is, however, of such length that it is not engaged by the tail 191 of the pawl 189 when this pawl is in engagement with the portion of the cam lying between the lobes or teeth 190. When, however, one of the teeth 190 is, through the action of the pawl 105 and the ratchet wheel 96, positioned beneath the pawl 189, the tail 191 of the pawl will be moved downwardly into such position that upon the return stroke of the slide it will engage the upper end of the bell crank lever 182, causing this lever to rotate in a clockwise direction, and actuating the levers 180, 176 and 174 in such manner as to move the lever 160 bodily inwardly to bring the inner end of the pin 165 into co-acting relation with the edges of the rings 166 and 167. Upon the forward stroke of the slide, the tail 191 of the pawl 189 will engage the upper end of the lever 188, thus rotating this lever in a counter-clockwise direction and through the action of the ring 186, levers 182, 180, 176 and 174 cause the lever 160 to be bodily displaced outwardly, thus disengaging the pin 165 from the slot formed by the rings 166 and 167 and causing its opposite end to engage the lobes of the slot formed by the rings 168 and 169.

While in the drawings, I have shown the teeth 190 of such size as to cause but a single line 171 to be engraved upon the work between two series of lines 170 and 172 having the crests displaced 180° from those of the line 171, it will be clear that by increasing the arcuate dimensions of the teeth 190 I can cause a plurality of lines 171 to be successively engraved upon the work. The mountings for the rings 166—167 and 168—169 comprise a spider 200 which is rigidly secured to the shaft 82 and to the opposite sides of which are secured the inner and outer plates 201 and 202, respectively, by means of rivets or bolts 203, or in any other suitable way. The rings 166 and 167 are secured to the plate 201 by means of a plurality of screws 204 and spaced therefrom by the sleeves 205 which surround the screws. In a similar manner the rings 168 and 169 are secured to the plate 202 in spaced relation by means of the screws 206 and the sleeves 207.

Figure 9:
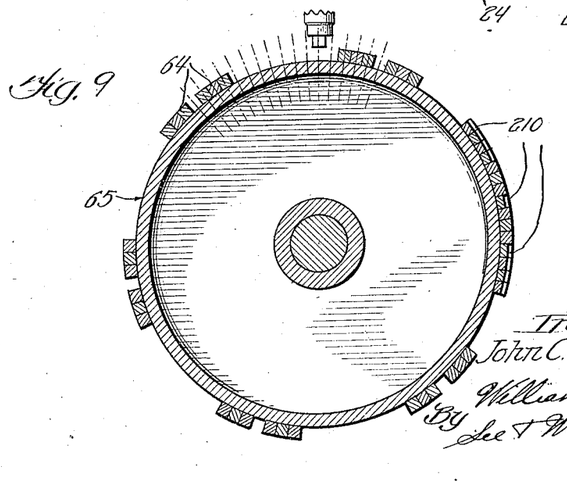

It will, of course, be understood from the above description that the positions of the template bars 64 upon the template drum 65 determine the points at which lines are engraved upon the work. When there is not a bar upon that portion of the drum directly underneath the following lever, a line will be chased upon the work, but when a bar comes into its operating position the following lever is slightly rotated about the shaft 50, thereby lifting the chasing tool from the object which is to be engraved. The lines obtained by this method need not be continuous as interruptions may be had by means of bars so shaped as to only lift the following lever at predetermined points instead of lifting it throughout an entire stroke. I have illustrated bars of this character at 210 (see Figure 9).

Figure 10:
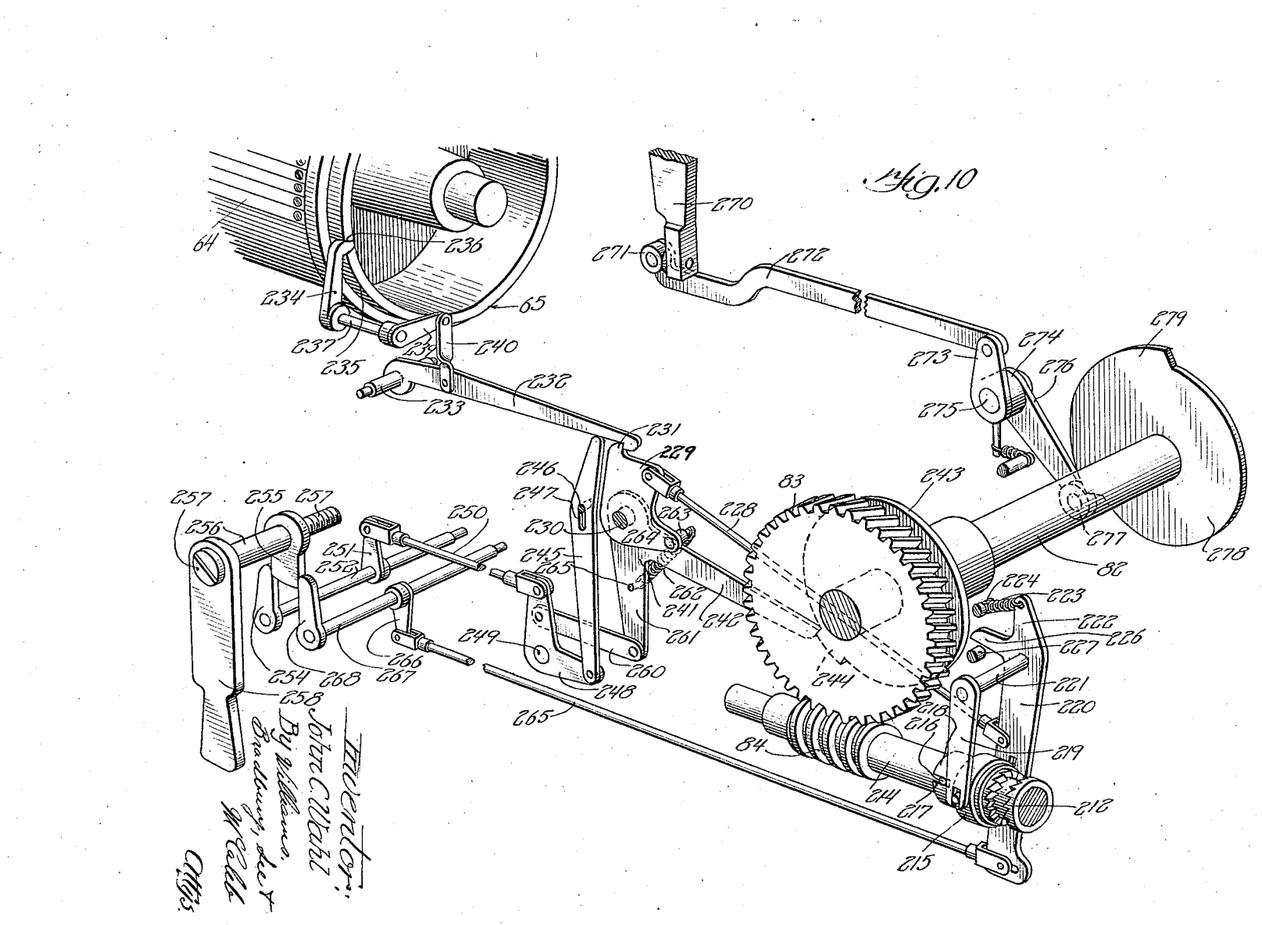
Figure 10 is a perspective view with parts broken away showing certain details of construction of the stopping and starting mechanism and the means for automatically raising the chasing tool from engagement with the work during the return stroke.

The means which I provide for automatically disengaging my improved machine from the source of power when the work has been completely engraved, or at least engraved through a predetermined arc, are clearly illustrated in Figures 1, 2, 4 and 10 and comprise a toothed clutch member 212 which in turn is rotatably mounted upon the shaft 214 carrying the worm 84. A second clutch member 215 is slidably mounted upon the shaft 214 and connected in driving relation therewith by means of the pin 216 which extends through the shaft 214 and the outer ends of which engage the sides of the slot 217 formed in the sleeve-like extension 218 of the clutch member 215. A pair of levers 219 and 220, which are pivotally mounted at 221 on the gear housing 85, have a pin and slot connection with the clutch member 215, as clearly shown in Figure 10. The lever 220 is provided with an upwardly extending arm 222 to which is connected one end of the tension spring 223, the other end of this spring being secured to a pin 224 projecting from the gear housing 85. The spring 223 tends to hold the two clutch members 212 and 215 in engagement with each other. An arm 226 projects from the lever 220 and is adapted to engage the pin 227 to limit the movement of the lever 220 in one direction. A link 228 connects the lever 220 intermediate its pivot point and its connection with the clutch member 215 with the bell crank lever 229 which is pivotally mounted upon the bed plate of my machine at 230. The upper arm of the bell crank lever is provided with a lug 231 which is adapted to be engaged by the rear end of the latch 232 which is pivotally mounted upon the slide 22 at 233. The engagement of the latch 232 with the lug 231 is determined by the position of the pawl 234, the free end of which rides upon the cylindrical surface 235 forming a rearward extension of the template drum. A notch 236 is cut into the cylindrical member 235 for receiving the free end of the pawl 234. The pawl 234 is rigidly secured to one end of the shaft 237, which is pivotally mounted in the bearing 238 forming a part of the slide (see Figure 2) and an arm 239 is rigidly mounted on the other end of the shaft 237. A link 240 connects the free end of the arm 239 with an intermediate portion of the latch member 232. When the free end of the pawl 234 is riding upon the cylindrical surface 235, the latch 232 is held in such a position that it can not engage the lug 231 of the bell crank lever 229, but when the free end of the pawl drops into the notch 236 the latch 232 drops into position to engage the lug 231 and the forward movement of the slide thereupon causes the bell crank lever 229 to rotate in a counter-clockwise direction. This movement is communicated to the lever 220 through the link 228, thereby causing the clutch member 215 to be disengaged from the clutch member 212, as shown in Figure 10, whereupon the machine comes to a stop. To prevent the momentum of the machine from keeping it in motion after the two clutch members have been disengaged I provide a brake lever 241, which is pivotally mounted upon the pin 230. The arm 242 of this brake lever projects rearwardly and rides upon the surface of the brake disc 243, which at one point in its periphery is provided with a tooth 244 which is engaged by the end of the arm 242 immediately after the separation of the clutch members 212 and 215, thereby bringing the machine to a dead stop.

Figure 4:
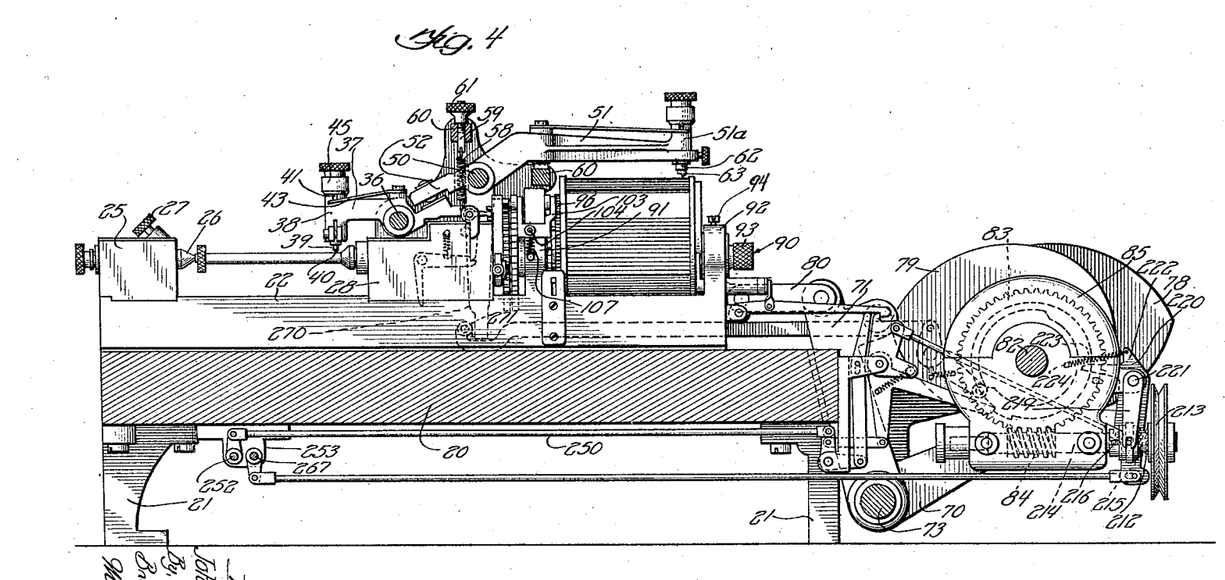
Figure 4 is a vertical longitudinal section taken substantially on line 4—4 of Figure 2.

For releasing the latch 232 from the lug 231 to start my machine, I provide the slide 245 which is supported on the base of my machine by the pin 246, which operates in the slot 247. The upper end of the slide 245 extends to a position immediately adjacent the lower edge of the latch 232, as shown in Figure 10. The lower end of the slide is pivotally connected with the rearwardly extending arm of the bell crank lever 248 which is pivotally mounted upon the bed plate of my machine at 249. The upwardly extending arm of the bell crank lever 248 is connected by a link 250 with the arm 251. The arm 251 is rigidly mounted upon the shaft 252 which, as shown in Figures 1 and 4, is supported by a suitable bearing 253 extending downwardly below the bed plate 20. The outer end of the shaft 252 is provided with a second arm 254 which extends upwardly in position to be engaged by the tappet arm 255, which is rigidly secured to one end of the sleeve 256. The sleeve 256 is rotatably supported by the bolt 257 mounted upon the bed plate 20. An operating handle 258 is secured to the outer end of the sleeve 256 and projects downwardly into position to be grasped by the operator. By turning the handle 258 in a clockwise direction the slide 245 is caused to move upwardly, thereby disengaging the latch 232 from the lug 231 and permitting the clutch member 215 to move into engagement with the clutch member 212 under the influence of the spring 223. At the same time, or slightly prior to the movement of the two clutch members, the link 260, the opposite ends of which are pivotally secured to the upwardly extending arm of the bell crank lever 248 and the downwardly extending arm 261 of the brake lever 241, causes the arm 242 of the brake lever to be disengaged from the tooth 244, thereby permitting the mechanism to start. A tension spring 262 having one end connected with the pin 263 extending from the rearwardly extending arm 264 of the bell crank lever 229 and the other end secured to a pin 265 extending from the arm 261 of the bell crank lever 241 tends to hold the arm 242 in engagement with the disc 243 and at the same time tends to hold the clutch member 215 in engagement with the clutch member 212.

A link 265 connects the lower end of the lever 220 with an arm 266 secured to the shaft 267. The shaft 267 is mounted in the same bearing 253 with the shaft 252 and carries at its outer end an arm 268 which extends upwardly into position to be engaged by the rear side of the tappet arm 255. By moving the handle 258 in a counter-clockwise direction the operator can disengage the clutch member 215 from the clutch member 212 and thus stop the machine at any time.

Referring to Figures 2, 4, 6 and 10, the reference character 270 indicates an arm which extends downwardly from shaft 50. The lower end of the lever 270 is adapted to be engaged by the anti-friction roller 271 carried by the forward end of the link 272. The rear end of the link 272 is pivotally connected with the upper end of the arm 273. The lower end of the arm 273 is rigidly connected with the hub 274, which is rotatably mounted upon the stud 275 and has projecting from the other end thereof an arm 276 provided at its free end with an anti-friction roller 277 which bears upon the periphery of the cam 278. The cam 278 is provided with a lobe 279 which, when in engagement with the anti-friction roller 277, causes the lever 270, through the action of the link 272 and arms 273 and 276, to be rotated in a counter-clockwise direction thereby causing the template lever to be tilted in the proper direction to raise the chasing tools from the work. This action takes place during the forward or return stroke of the slide 22. The subject matter described in this paragraph is the same as that illustrated and described in my co-pending application referred to above, and further description thereof appears to be unnecessary.

While I have described the details of construction of the preferred embodiment of my machine, and the use to which it is particularly adapted, it is to be clearly understood that my invention is not limited to these details of construction, but is capable of other adaptations and modifications within the scope of the appended claims.

Having thus described my invention, what I claim is:

1. A chasing machine comprising a slide, a work-holding spindle rotatably mounted on said slide, a chasing tool, means for reciprocating said slide and chasing tool relatively to each other, means for bringing said chasing tool into and out of engagement with the work carried by said spindle comprising a template drum mounted to rotate about an axis parallel with said spindle, means for rotating said spindle and template drum through arcs of predetermined degree comprising a ratchet wheel secured to said spindle and template drum respectively, a pawl for each of said ratchet wheels, common means actuated by the reciprocation of said slide for actuating said pawls, means for releasing the pawl from the ratchet wheel connected with said spindle at the end of each advancement of said ratchet, and means for oscillating said spindle comprising a clutch member, means for locking said clutch member to said spindle during the cutting stroke, and for releasing it from said spindle while said spindle is being advanced by said pawl and ratchet, means for oscillating said clutch member comprising a pair of cams having serrated edges, the crests of one cam being displaced from the crests of the other cam, a follower for co-acting with either of said cams, means controlled by the movement of said template drum for alternately bringing said follower into co-acting relation with each of said cams, and a driving connection between said follower and said clutch member.

2. A chasing machine comprising a slide, a work-holding spindle rotatably mounted on said slide, a chasing tool, means for reciprocating said slide and chasing tool relatively to each other, means for bringing said chasing tool into and out of engagement with the work carried by said spindle comprising a template drum mounted to rotate about an axis parallel with said spindle, means for rotating said spindle and template drum through arcs of predetermined degree comprising a ratchet wheel secured to said spindle and template drum respectively, a pawl for each of said ratchet wheels, means for actuating said pawls, means for releasing the pawl from the ratchet wheel connected with said spindle at the end of each advancement of said ratchet, and means for oscillating said spindle comprising a clutch member, means for locking said clutch member to said spindle during the cutting stroke, and for releasing it from said spindle while said spindle is being advanced by said pawl and ratchet, means for oscillating said clutch member comprising a cam having a serrated edge, a follower for coacting with said serrated edge, and a driving connection between said follower and said clutch member.

3. A chasing machine comprising a slide, a work-holding spindle rotatably mounted on said slide, a chasing tool, means for reciprocating said slide and chasing tool relatively to each other, means for bringing said chasing tool into and out of engagement with the work carried by said spindle comprising a template drum mounted to rotate about an axis parallel with said spindle, means for rotating said spindle and template drum through arcs of predetermined degree comprising a ratchet wheel secured to said spindle and template drum respectively, a pawl for each of said ratchet wheels, means for actuating said pawls, means for releasing the pawl from the ratchet wheel connected with said spindle at the end of each advancement of said ratchet, and means for oscillating said spindle comprising a clutch member, means for locking said clutch member to said spindle during the cutting stroke, and for releasing it from said spindle while said spindle is being advanced by said pawl and ratchet, means for oscillating said clutch member.

4. A chasing machine comprising a slide, a work-holding spindle rotatably mounted on said slide, a chasing tool, means for reciprocating said slide and chasing tool relatively to each other, means for bringing said chasing tool into and out of engagement with the work carried by said spindle comprising a template carrier, means for rotating said spindle through arcs of predetermined degree comprising a ratchet wheel secured to said spindle, a pawl for said ratchet wheel, means for actuating said pawl, means for releasing the pawl from the ratchet wheel at the end of each advancement of said ratchet, and means for oscillating said spindle comprising a clutch member, means for locking said clutch member to said spindle during the cutting stroke, and for releasing it from said spindle while said spindle is being advanced by said pawl and ratchet, means for oscillating said clutch member.

5. A chasing machine comprising a slide, a work-holding spindle rotatably mounted on said slide, a chasing tool, means for reciprocating said slide and chasing tool relatively to each other, means for bringing said chasing tool into and out of engagement with the work carried by said spindle comprising a template carrier, means for rotating said spindle through arcs of predetermined degree comprising a ratchet wheel secured to said spindle, a pawl for said ratchet wheel, means for actuating said pawl, means for releasing the pawl from the ratchet wheel at the end of each advancement of said ratchet, and means for oscillating said spindle.

6. A chasing machine comprising a slide, a work-holding spindle rotatably mounted on said slide, a chasing tool, means for reciprocating said slide and chasing tool relatively to each other, means for bringing said tool into and out of engagement with the work carried by said work-holding spindle, means for successively rotating said spindle through arcs of predetermined degree, means for oscillating said spindle, and means for releasing said last named means from said spindle while said spindle is being advanced by said rotating means.

7. A chasing machine comprising a work-holding device, a chasing tool, means for reciprocating said work-holding device and said chasing tool relatively to each other, means for successively rotating said work-holding device and said tool relatively to each other about the axis of said work holding device and through predetermined arcs, means for oscillating said work-holding device and said tool relatively to each other, and means for rendering each of the last two mentioned means inoperative when the other is in operation.

8. A chasing machine comprising a work-holding device, a chasing tool, means for successively rotating said work-holding device and said tool relatively to each other about the axis of said work holding device and through predetermined arcs, means for oscillating said work-holding device and said tool relatively to each other, and means for rendering each of the last two mentioned means inoperative when the other is in operation.

9. A chasing machine comprising a spindle for holding an article having a cylindrical surface, a chasing tool, means for moving said tool and spindle angularly and longitudinally relatively to each other for engraving sinuous lines upon said cylindrical surface, and means for automatically changing the relation of said tool to said spindle to displace the crests of said lines relatively to each other.

10. A chasing machine comprising a work-holding spindle, a chasing tool, means for reciprocating said spindle and said tool relatively to each other, means for bringing said tool into and out of contact with the work held by said spindle, means for successively rotating said spindle through predetermined arcs to form a plurality of engraved lines, means for oscillating said spindle and tool relatively to each other, and means for changing the relative movements of said spindle and tool to displace the crests of successive lines relatively to each other.

11. A chasing machine comprising a work-holding spindle, a chasing tool, means for moving said work-holding spindle and said chasing tool relatively to each other comprising a clutch having two co-acting members, and means for automatically disengaging said clutch member comprising an actuating means having two inter-locking parts, and means controlled by the position of said spindle for bringing said inter-locking parts into co-acting relation.

12. A chasing machine comprising a work-holding spindle, a chasing tool, means for moving said work-holding spindle and said chasing tool relatively to each other comprising a clutch having two co-acting members, and means for automatically disengaging said clutch members controlled by the position of said work-holding spindle.

13. A chasing machine comprising a work-holding spindle, a chasing tool, means for reciprocating said spindle and tool relatively to each other, means for successively rotating said spindle through predetermined arcs, means for transmitting power to said reciprocating and rotating means comprising a clutch, and means controlled by the position of said spindle for rendering said clutch inoperative.

14. A chasing machine comprising a work-holding spindle, a chasing tool, means for reciprocating said spindle and tool relatively to each other, a driving connection, and means actuated by the movement of the reciprocating part for rendering said driving connection inoperative, said last mentioned means comprising means operable only after said reciprocating part has made a plurality of reciprocations.

In witness whereof, I hereunto subscribe my name this 16th day of November, 1920.

JOHN C. WAHL.

Witnesses:
WALL. D. CEFFT,
W. H. SMITH.